United States Patent
Lee et al.

(10) Patent No.: US 6,804,772 B2
(45) Date of Patent: Oct. 12, 2004

(54) DYNAMIC FIELD PATCHABLE MICROARCHITECTURE

(75) Inventors: Sherman Lee, Rancho Palos Verdes, CA (US); Vivian Y. Chou, Alhambra, CA (US); John H. Lin, Downey, CA (US)

(73) Assignee: Broadcom Corporation, Irvine, CA (US)

( * ) Notice: Subject to any disclaimer, the term of this patent is extended or adjusted under 35 U.S.C. 154(b) by 484 days.

(21) Appl. No.: 09/815,098

(22) Filed: Mar. 21, 2001

(65) Prior Publication Data

US 2001/0052066 A1 Dec. 13, 2001

Related U.S. Application Data

(63) Continuation-in-part of application No. 09/593,583, filed on Jun. 12, 2000, now Pat. No. 6,650,880.

(51) Int. Cl.[7] .................. G06F 12/02; G06F 15/04; G06F 13/16; G06F 12/16

(52) U.S. Cl. .................. 712/248; 711/149; 711/152

(58) Field of Search .................. 712/36, 227, 248; 711/103, 105, 171, 149, 152; 710/14, 38; 717/173, 178; 365/49

(56) References Cited

U.S. PATENT DOCUMENTS

| | | | | | |
|---|---|---|---|---|---|
| 4,897,813 | A | * | 1/1990 | Kumbasar | ............... 365/49 |
| 5,796,972 | A | * | 8/1998 | Johnson et al. | ............. 712/208 |
| 5,796,974 | A | * | 8/1998 | Goddard et al. | ............ 712/211 |

* cited by examiner

Primary Examiner—Daniel H. Pan
(74) Attorney, Agent, or Firm—Christie, Parker & Hale, LLP

(57) ABSTRACT

A microprocessor memory architecture including a read-only memory (ROM) with programmed microcode and a random access memory (RAM) capable of storing microcode and one or more data bits used for the selection of corresponding ROM or RAM microcode for execution. A multiplexer receives input signals from both the ROM microcode and RAM microcode, and a control signal which is one or more RAM data bits is used to select from the RAM or ROM microcode inputs for further execution by the microprocessor.

7 Claims, 17 Drawing Sheets

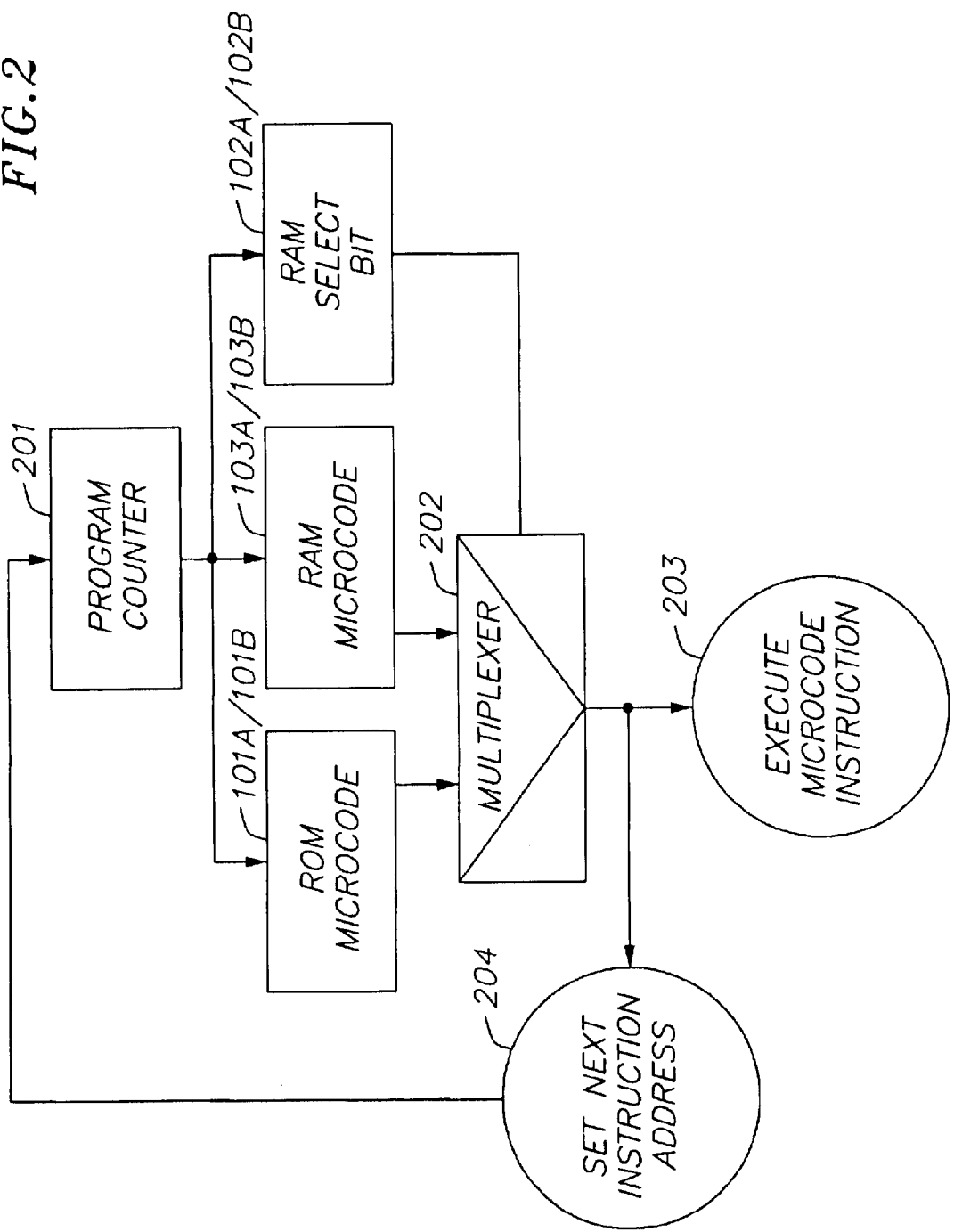

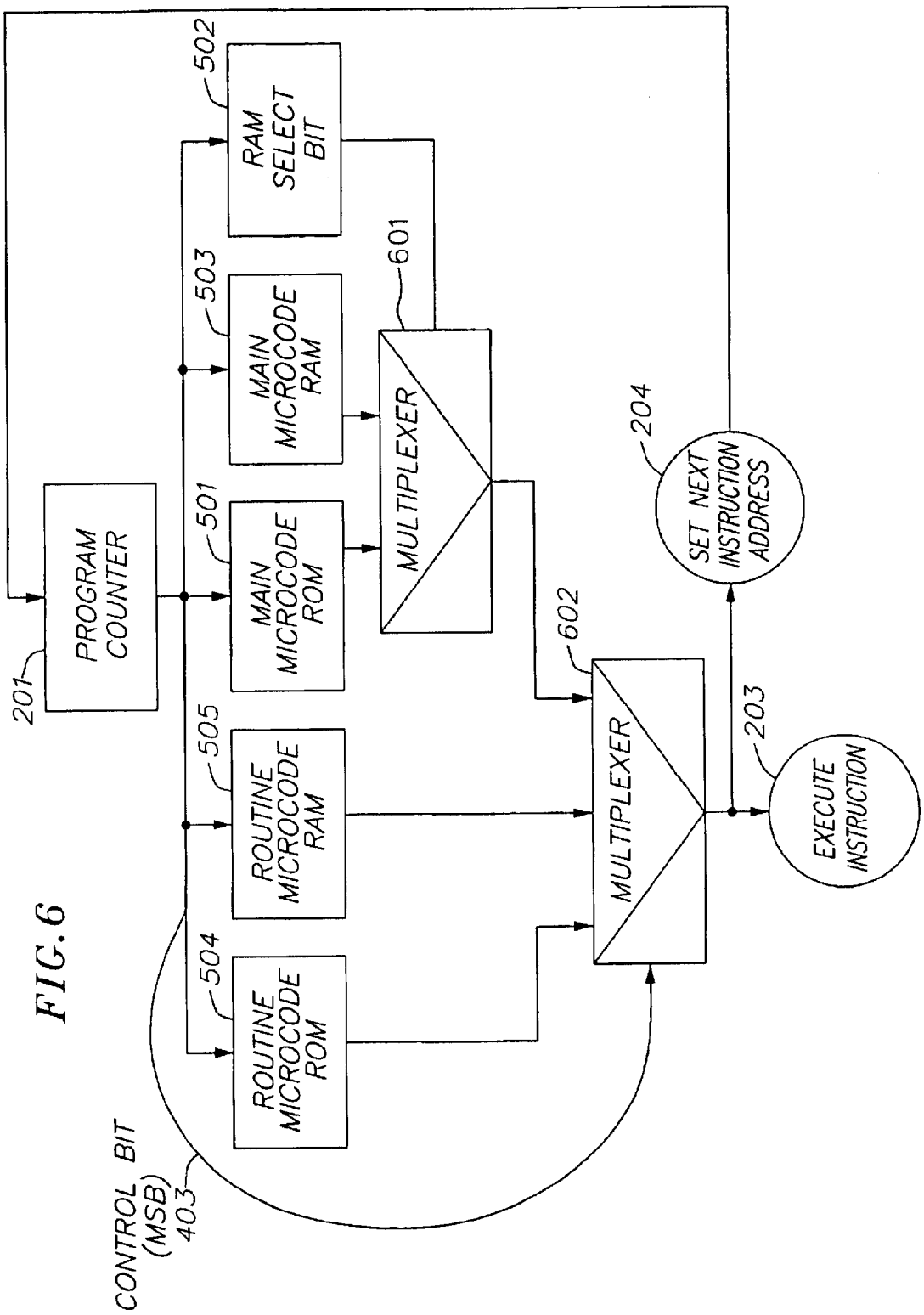

INDEX METHOD-UPDATED

DYNAMIC FIELD PATCHABLE MICROARCHITECTURE

CROSS REFERENCE TO RELATED APPLICATIONS

The present application is a continuation-in-part of U.S. patent application Ser. No. 09/593,583, entitled "WIRELESS DATA COMMUNICATIONS USING FIFO FOR SYNCHRONIZATION MEMORY", and filed Jun. 12, 2000, now U.S. Pat. No. 6,650,880, the contents of which is fully incorporated herein by reference.

FIELD OF THE INVENTION

This disclosure relates to microprocessor system architecture, and more particularly to a microprocessor architecture that allows read-only memory (ROM) microcode to be effectively altered or enhanced without the need to reprogram or replace the ROM.

BACKGROUND

A microprocessor is a central processing unit (CPU) enclosed in one integrated circuit (IC) package. Because of their small size and low cost, microprocessors have revolutionized digital system design technology, giving the designer the capability to create structures that were previously uneconomical. Microprocessors are used in a wide variety of applications. They can function as a CPU in a general purpose computer or as a processor unit in a special purpose, automated system.

Microprocessor systems usually incorporate several different types of memory devices to hold data for processing and instructions for system control. Memory devices come in a wide variety of forms. Two of the more common forms are generally referred to as "read-only memory" (ROM) and "random access memory" (RAM). In its simplest form, sometimes called "mask-programmed", a ROM memory device is manufactured with fixed contents. The binary information stored in the ROM is made permanent during the hardware production of the unit and cannot subsequently be altered. Such a ROM memory unit allows the read operation only; it does not have a write capability. ROM is most often used to hold microcode, the lowest level instructions that directly control a microprocessor and immutable data such as tables of constants. As used herein, the term "microcode" can refer both to microprocessor instructions and immutable data programmed into ROM.

By contrast, a RAM is a data storage device that allows both the read and write function. A system CPU uses its RAM as a storage area for data, calculation results, and program instructions, drawing on this storage as necessary to perform the tasks required by programs. Its binary contents can easily be changed during operation and its stored data is typically erased or lost when the device incorporating it is powered off. Part of the initial "power-up" or boot routine for microprocessor systems includes the loading of desired or necessary code into RAM according to the system design.

Microprocessor systems may also incorporate some type of "non-volatile" memory, such as a hard-disk. Like RAM, such memory can usually be read or written to, but unlike RAM its content is preserved until over-written, even without system power.

More recent varieties of ROM provide for some limited programming capability after manufacture. PROM ("programmable read-only memory") devices can be programmed by the end user, but only once. EPROM ("erasable programmable read-only memory") can be erased and then reprogrammed, but must be removed from the system to do so. EEPROM ("electronic erasable read-only memory") can be erased and programmed electrically some limited number of times with standard supply voltages while in the system. However, such devices come with increased cost and limitations of their own. As noted, PROM can only be programmed once and EPROM must be removed from the system to be reprogrammed. EEPROM must be erased and reprogrammed in its entirety, not selectively. For many processing systems, especially those used to perform set, repetitive tasks, it is desirable to use the cheapest and simplest ROM, usually of the "mask programmed" variety, with minimal reliance on more expensive RAM or other types of memory devices.

In even the simplest microprocessor system it may be desirable to alter the contents of the ROM to, for example, correct errors in the microcode or add new capabilities to it. The disclosed system allows for alterations in the processing of ROM microcode or data without incurring the added expense and complexity of integrating some form of programmable ROM, large amounts of RAM, or nonvolatile memory into the system.

SUMMARY

In accordance with this disclosure, a microprocessor system architecture allows for the selective execution of programmed ROM microcode or, alternatively, RAM microcode if there has been a correction or update made to the ROM microcode originally programmed into the system. Patched or updated RAM microcode is utilized or executed only to the extent of changes to the ROM microcode, otherwise the ROM microcode is executed in its normal fashion.

When a patch is received, it is loaded into system RAM along with instructions or other appropriate signals to direct the execution of the patched or updated microcode from RAM instead of the existing ROM microcode. Those skilled in the art will appreciate and understand that a variety of techniques can be utilized to direct the execution of patched or updated RAM microcode rather than corresponding ROM microcode, only a few of which are discussed in some detail below.

BRIEF DESCRIPTION OF THE DRAWINGS

In FIG. 1A, all microcode ROM is associated with an area of microcode RAM. In FIG. 1B, all microcode ROM shares a common address with microcode RAM, but additional address areas for microcode RAM are allocated to accept new microcode.

FIG. 2 is a block diagram showing the functional implementation of the memory architecture illustrated in FIG. 1.

FIG. 5A illustrates the selection of microcode ROM in the absence of any patches. FIG. 5B illustrates the selection of patch microcode RAM when present, and FIG. 5C illustrates the selection of patch microcode RAM when new routines are available.

FIG. 6 is a block diagram showing the functional implementation of the memory architecture illustrated in FIGS. 5A, 5B, and 5C.

FIG. 7A illustrates the selection of main microcode ROM in the absent of any changes. FIG. 7B illustrates the selection of patch microcode RAM when changes are present, and FIG. 7C illustrates the selection of patch microcode RAM when new instructions are present.

FIG. 9A shows how ROM routines are mapped into RAM for execution in the absence of any patches or updates. FIG. 9B illustrates how patch RAM routines are executed instead of ROM routines. FIG. 9C illustrates how entirely new RAM microcode is processed by the system.

DETAILED DESCRIPTION

Figure 1A:
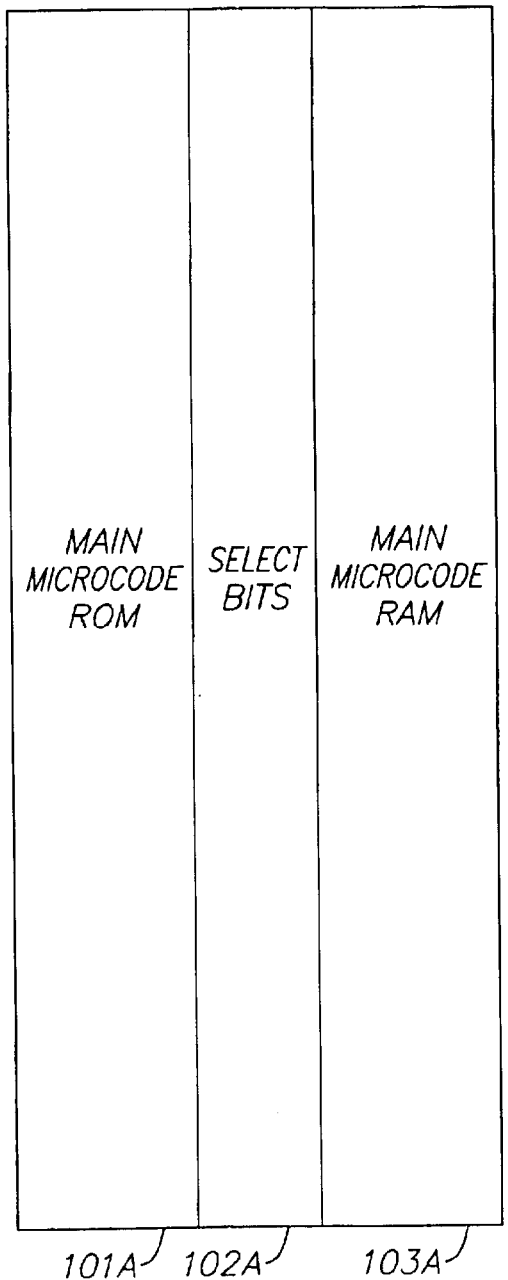
FIGS. 1A and 1B illustrate alternative embodiments of a memory architecture for a microprocessor in which microcode ROM and microcode RAM share a common memory address area, along with a "select" RAM bit used to control the selection of microcode ROM or microcode RAM for execution by the microprocessor.

As used herein, the term "patch" is intended to mean any correction, change, or alteration to the original microcode stored in a microprocessor system's read-only memory (ROM). The terms "patch" or "update" may also be used herein to refer to microcode developed after the original programming of system ROM microcode for the implementation of new instructions or routines.

As used herein, the term "microcode" is intended to refer to the programmed contents of ROM, including the lowest level instructions that directly control a microprocessor and fixed data such as tables of constants.

There are several reasons why it might be desirable or even necessary to make changes in the programmed ROM of a microprocessor, corrections to existing code or the addition of new code being chief among them. For systems utilizing only the cheapest, unalterable ROM, such changes are not possible with existing system architectures. Thus, to correct errors in the microcode, or to implement new capabilities, it is necessary to completely replace the defective or outmoded ROM devices if not the entire unit incorporating them, an expensive and inconvenient process.

The system disclosed herein effectively allows for changes in otherwise unalterable ROM microcode, by loading microcode changes into a minimal amount of associated RAM and then providing for the selective execution of the existing ROM microcode or the changed RAM microcode. The disclosed techniques can be applied to any microprocessor system, but will be most beneficial for those systems that for economic or other reasons primarily rely on ROM memory devices that are programmed at system manufacture and incapable of alteration once programmed.

Patch or updated microcode can be received and taken into the system in the same manner as other forms of data by, for example, modem, wireless data link, disk, or CD. Once received, the patch may be stored in any non-volatile memory device accessible by the system, where it will be available for subsequent loading into the associated RAM. Alternatively, when initially received from an external source, the patch microcode may be simultaneously loaded into RAM (for immediate use) and into available non-volatile memory for more permanent storage and future access.

A microprocessor system's architecture is closely related to the organization of its memory. The amount of memory needed to perform the desired function(s), the type of memory to be used, and the organization of that memory must be considered by the system designer, along with other factors such as cost and size.

Depending upon the particular embodiment, as more fully discussed below, each address of at least one portion of the designated RAM address area(s) will contain one or more control or "select" bits to signal a change to existing ROM microcode. During program execution, when the select bit is detected, the system is directed to execute the changed RAM microcode rather than existing ROM microcode.

There are a variety of methods for initiating the use of patch RAM microcode instead of or in addition to original ROM microcode, as discussed in the following embodiments.

Figure 1B:
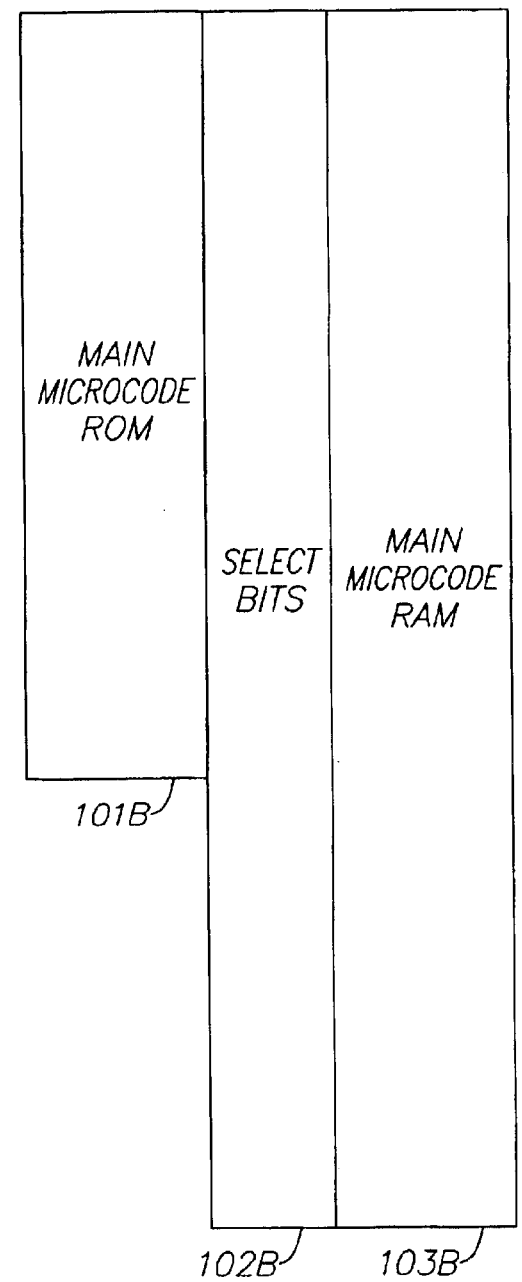

FIGS. 1A and 1B illustrate a memory architecture in which each pre-assigned block of ROM microcode 101A, 101B in the alternative embodiments has a corresponding block of RAM 103A, 103B. It is to be understood that the blocks of FIGS. 1A, 1B are merely representative of conventional memory circuitry present in or associated with a microprocessor including the arrays of memory cells, addressing and control circuitry, and other conventional memory elements. Each ROM memory space consists of n bits, whereas the corresponding RAM memory address space consists of n+1 bits. The extra RAM bit 102A, 102B in each memory word may be referred to as a "select bit". It is capable of being individually read (and written to) and is used to select the execution of RAM or ROM microcode as appropriate. The status of the select bit (on/off, 0/1) is set as part of the patch routine when received by the system. In FIG. 1A, there are an equal number of ROM and RAM bits I the address space, allowing for the correction or replacement of some or all of the ROM microcode held in the designated memory address blocks. In FIG. 1A, the RAM memory address space is larger than the ROM address space, allowing for the addition of altogether new microcode. This means there are more memory locations available in memory 103B than in 101B.

FIG. 2 illustrates one method for implementing the memory architecture shown in FIGS. 1A and 1B. To execute a particular microcode instruction, the program counter 201 or other control unit conventionally present in a microprocessor simultaneously addresses main ROM 101A, 101B, main RAM 103A, 103B, and the RAM select bit 102A, 102B. The ROM microcode and RAM microcode instructions held in the respective memory at the selected address are input to a conventional circuit multiplexer 202. The RAM select bit is input to the select terminal of the multiplexer and used to control the selection of ROM microcode or RAM microcode as the output signal of the multiplexer. Depending upon the status of the select bit, the multiplexer selects either the ROM microcode or the RAM microcode for output and further processing. For example, if the select bit is set to a binary value of "1", the RAM microcode is selected, otherwise ROM microcode is selected. The microcode selected for output from the multiplexer is then executed through conventional microcode processing logic circuits 203 and the program counter 201 incremented or branched as necessary to initiate the next microcode instruction, again through conventional means 204.

Figure 3:
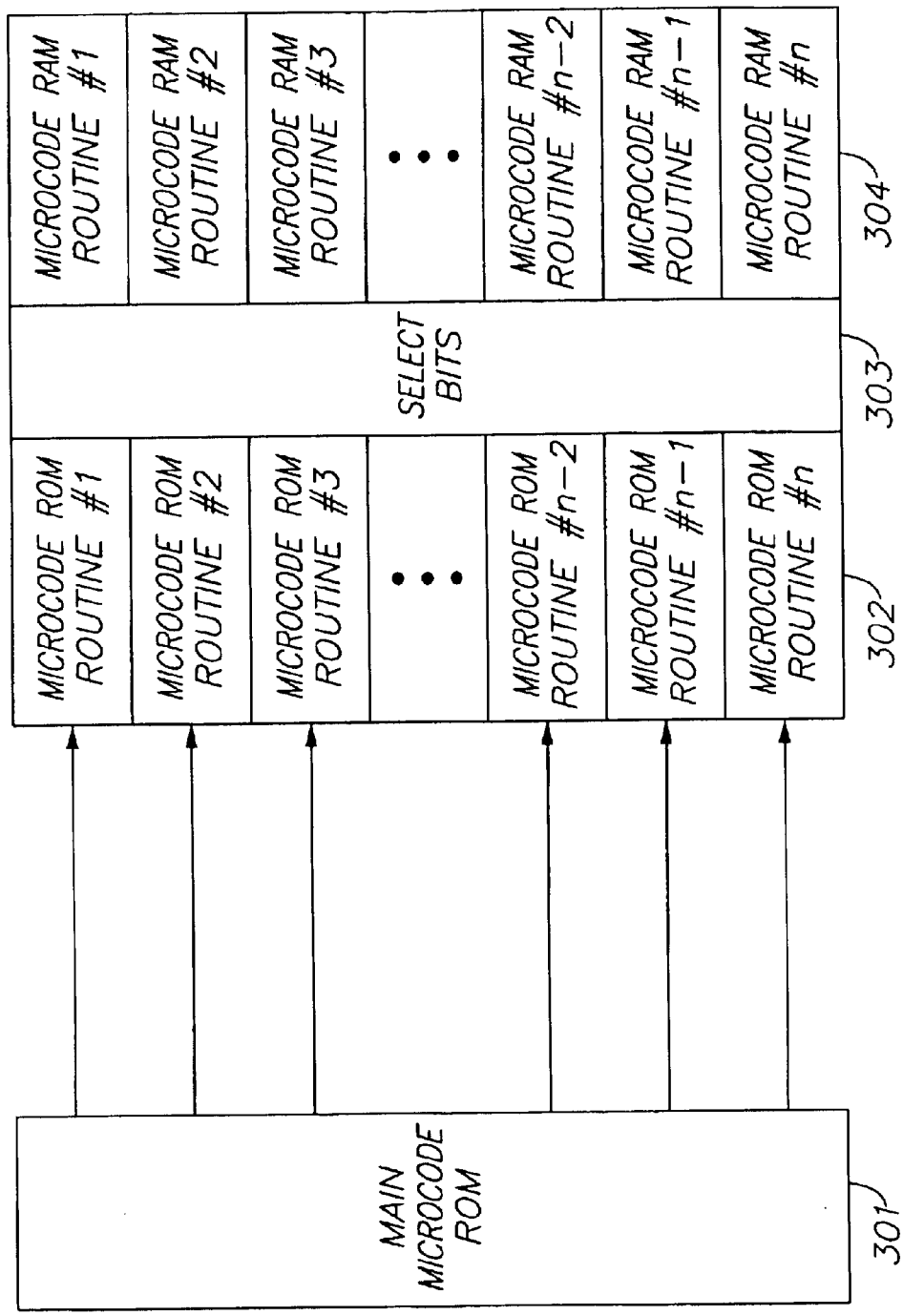
FIG. 3 illustrates a memory architecture in which microcode ROM is split between two ROM circuits, one containing main instructions and the other containing sub-routine instructions. A RAM circuit memory area shares addresses with the microcode ROM sub-routines, along with a "select" RAM bit used to control the selection of microcode ROM routines or microcode RAM routines.

Those skilled in the art will understand that microprocessor programs frequently utilize conditional or branched sub-routines during their execution. Thus, for example, if some condition is met during the execution of a program, the program may be directed to branch to a designated sub-routine and, once the sub-routine is completed, return to the main program instructions. Together, these sub-routines will often include more microcode instructions and occupy more memory space than the main program instructions. FIG. 3 illustrates a microprocessor memory architecture in which ROM microcode is programmed into two separate memory circuits One circuit, denoted "main ROM 301, stores the basic program instructions while another circuit, denoted "routine" ROM 302 stores the microcode for the execution of sub-routines 1 through n as called for by the main program. When an instruction executed from the main ROM requires branching to a sub-routine in the routine ROM for subsequent execution, the address of the required sub-routine is sent to the program counter or similar conventional control unit. The address of the sub-routine will include a bit, usually the most significant bit (MSB), to denote the circuit 301 or 302, containing the sub-routine microcode for execution. The use of the address MSB or other control bit to signify which of several available memory circuits contains a desired instruction is a well-known technique.

In this embodiment, similar to the memory architecture illustrated in FIGS. 1A and 1B, each n-bit block of routine ROM microcode (instruction word) shares the same address as an n+1 bit block of RAM, where n is equal to the number of bits allocated to store each micro-code instruction. Any patches or changes to a routine ROM microcode are loaded into the corresponding (that is, same) address in RAM 304, along with an extra "select" bit 303 used to signal the existence of a change in the routine ROM microcode. This allows for the use of less RAM than that depicted in FIGS. 1A and 1B, although it is not possible to make changes to the main ROM microcode once it is programmed.

Figure 4:
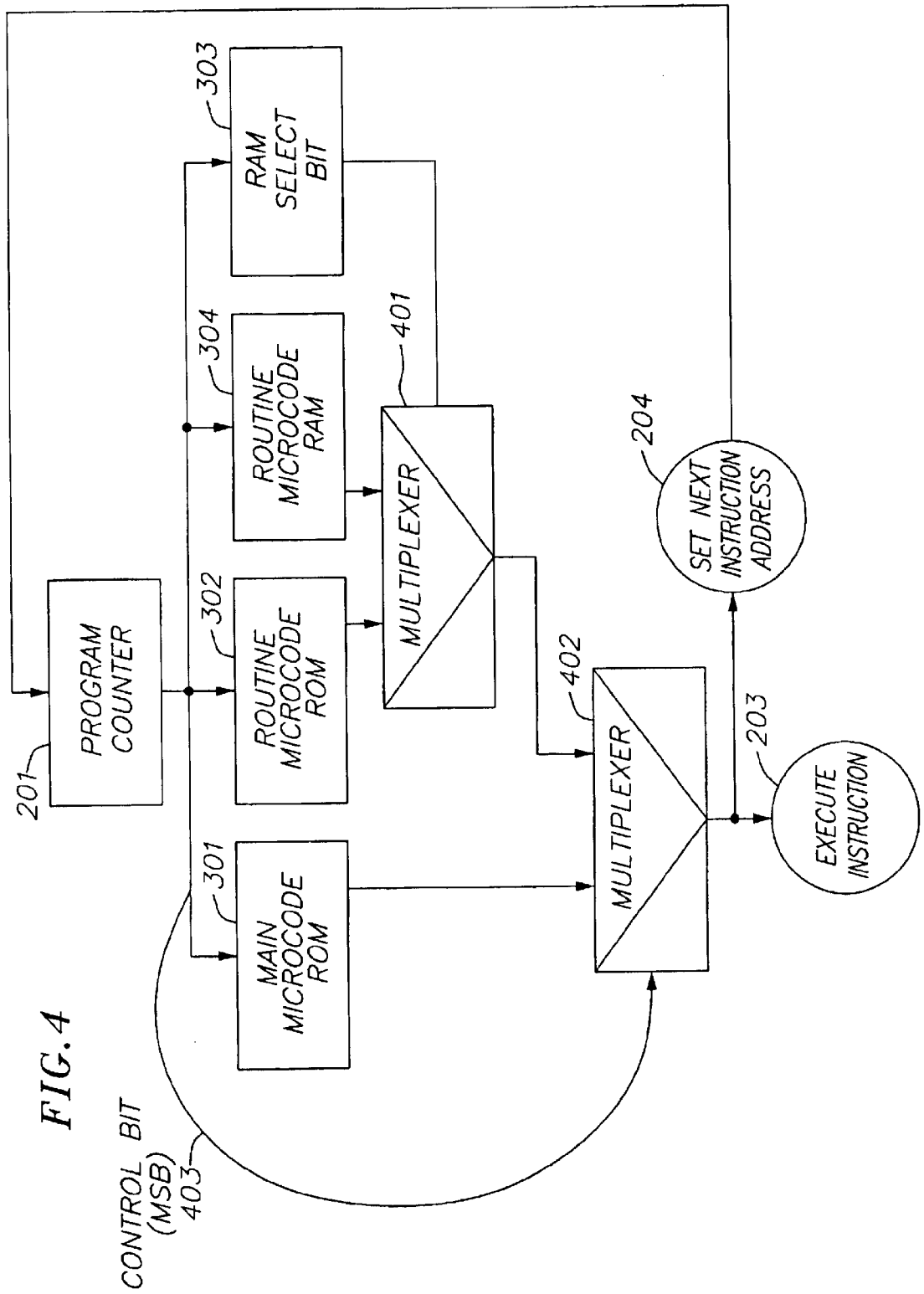
FIG. 4 is a block diagram showing the functional implementation of the memory architecture illustrated in FIG. 3.

FIG. 4 illustrates a microprocessor system for implementing the memory architecture shown in FIG. 3. Here, the program counter 201 simultaneously addresses main ROM 301, routine ROM 302, routine RAM 304, and the RAM select bit 303. The routine ROM 302 and routine RAM 304 microcode are input to a multiplexer 401. The RAM select bit 303 applied to the control terminal of multiplexer 401 controls the selection of routine ROM microcode or routine RAM microcode as the output signal of the multiplexer. Depending upon the status of the select bit, the multiplexer selects either the routine ROM microcode 302 or the routine RAM microcode 304 for output. The selected output from multiplexer 401 is input to another multiplexer 402. Main ROM microcode 301 is also input to multiplexer 402. The most significant bit (MSB) or other control bit 403 from the program counter 201 is used to select the output of multiplexer 402. Depending upon the status of the MSB or other control bit, main ROM microcode or the output of multiplexer 401 (routine ROM or routine RAM microcode) is selected for output and further processing. The microcode selected for output from multiplexer 402 is then executed by conventional means 203 and the program counter incremented or branched as required by conventional means 204 to initiate the next microcode instruction.

Figure 5A:
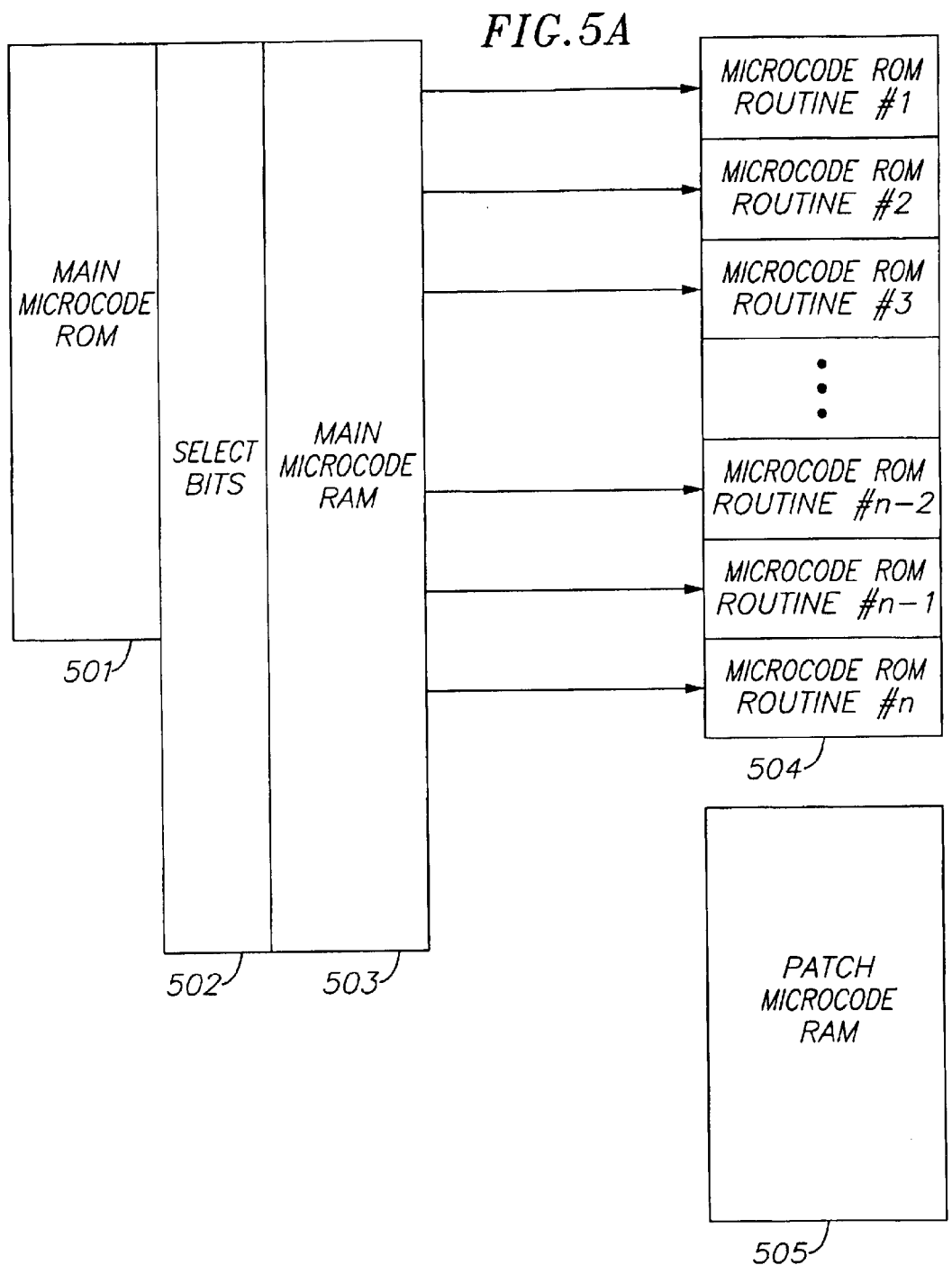
FIGS. 5A, 5B, and 5C illustrate a memory architecture in which the ROM is divided into main portion and a "routine" portion consisting of sub-routine instructions. A specified RAM bit is used to control the selection of main microcode ROM or main microcode RAM, and associated "routine" ROM or patches loaded into RAM.
Figure 5B:
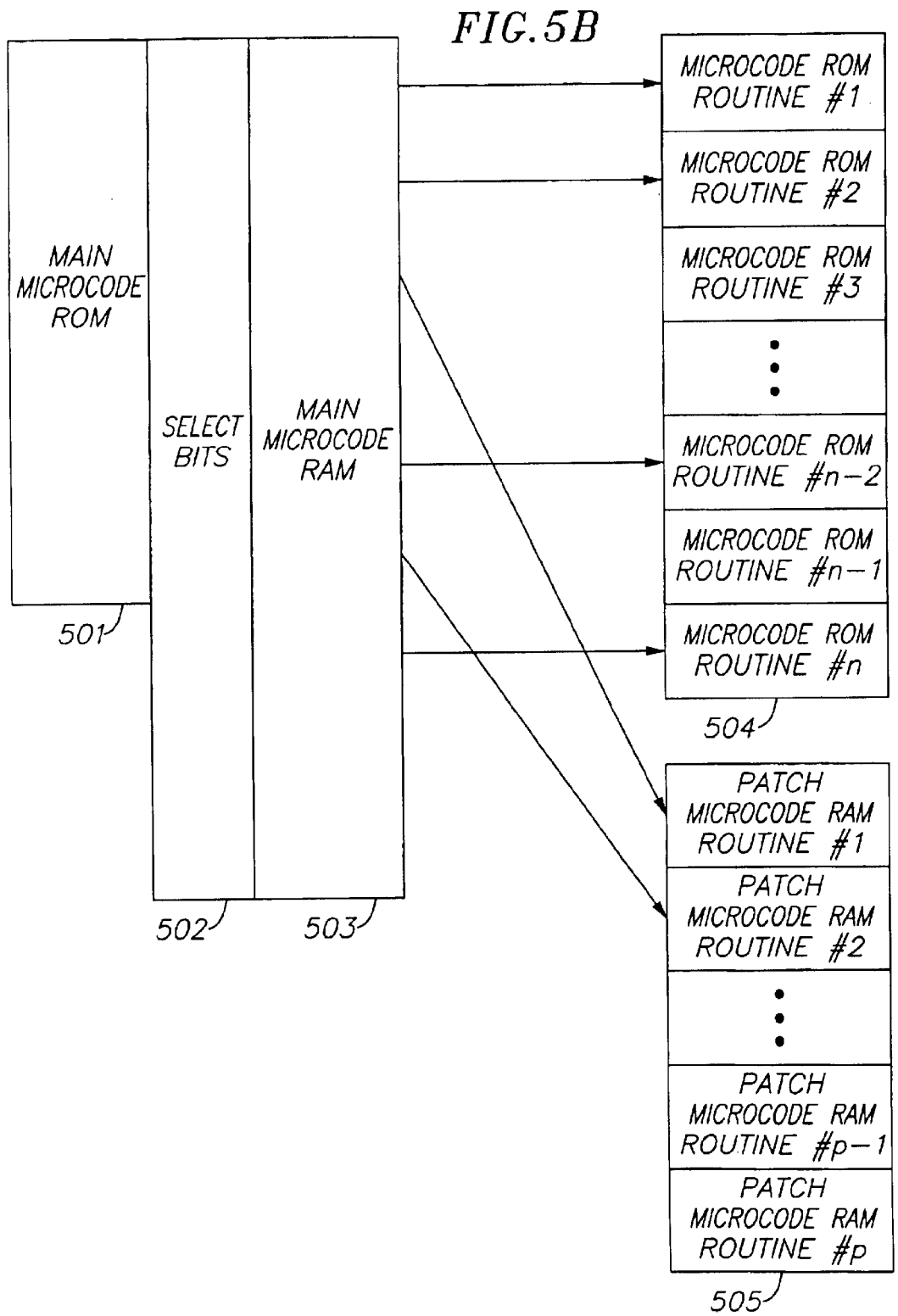
Figure 5C:
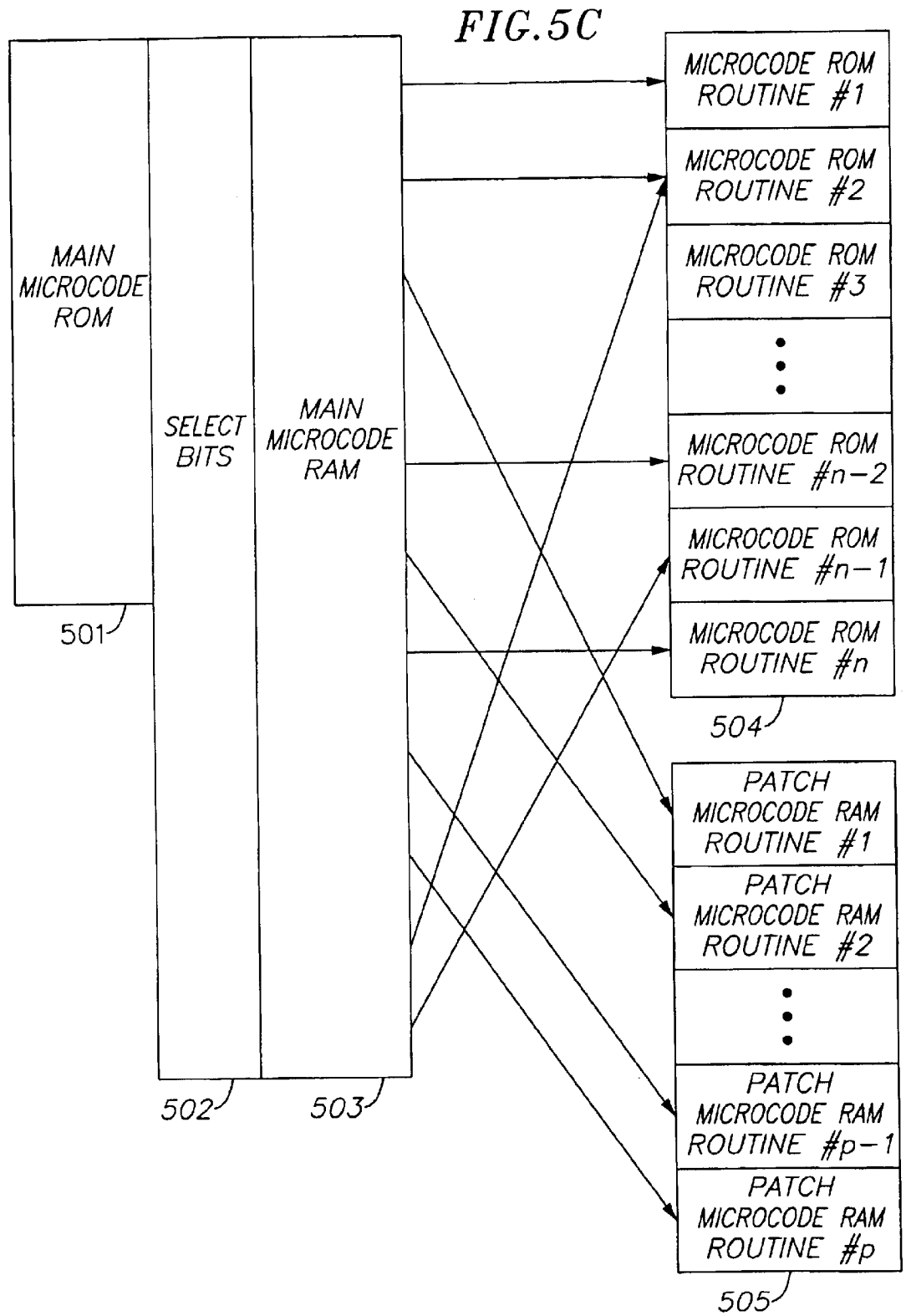

FIGS. 5A, 5B, and 5C illustrate a memory architecture in which ROM microcode is again segregated into separate circuits, one for "main" ROM microcode 501 and the other for "routine" ROM microcode 504. The main ROM address area 501 contains the basic program instructions while the routine ROM address area 504 contains the sub-routines that may be called for during the execution of the main program instructions. Similar to the architecture of FIGS. 1A and 1B, with regard to the main microcode ROM circuit, each pre-assigned n-bit block of ROM microcode 501 has a corresponding block of RAM 503 that is n+1 bits wide. The extra RAM bit 502 may be referred to as a "select bit". It is capable of being individually read (and written to) and is used to select the execution of RAM or ROM microcode for the main program instructions as appropriate. In this case, main RAM 503 is allocated a larger memory space than main ROM 501 to allow for the implementation of new, not just altered program microcode, which can be stored in the additional RAM memory space. An additional RAM circuit, designated "routine" RAM 505, is incorporated to accept the loading of changes to the routine ROM microcode.

As shown in FIG. 5A and further explained below with reference to FIG. 6, when there are no changes to the routine ROM microcode 501, the main ROM instruction will invoke the execution of routine ROM instructions when required. Referring to FIG. 5B, when there has been a change to any of the main microcode ROM instructions, they will be loaded in the corresponding main microcode RAM address area, and the change signified by the select bit 502. New or additional main instructions can also be loaded into main microcode RAM 503. As further shown in FIGS. 5B and 5C, new or updated sub-routines can be loaded into patch microcode RAM 505 to be called for as needed by the main microcode instructions in main ROM 501 or RAM 503.

FIG. 6 illustrates a system for implementing the memory architecture shown in FIGS. 5A, 5B, and 5C. In this case, the program counter 201 simultaneously addresses main ROM 501, main RAM 503, routine ROM 504, routine RAM 505, and the RAM select bit 502. The addressed main ROM microcode and main RAM microcode are used as inputs to multiplexer 601. The RAM select bit 502 is applied to the control terminal of multiplexer 601 to control the output signal of the multiplexer, either main ROM microcode or main RAM microcode. This output is then directed to multiplexer 602. Routine ROM microcode 504 and routine RAM microcode 505 are also input to multiplexer 602. In this case, two control bits (typically the two most significant bits, MSBs) 403 from the program counter 201 are applied to the multiplexer's select terminals since there are three possible outputs. As discussed above, the use of such control bits to designate the use of one of several memory circuits is well-known. Depending upon the status of the MSBs or other control bits, routine ROM microcode, routine RAM microcode, or the output of multiplexer 601 (main ROM or main RAM microcode) is selected for output and further processing conventionally. The microcode selected for output from multiplexer 602 is then executed 203 and the program counter incremented or branched as required 204 to initiate the next microcode instruction.

Figure 7A:
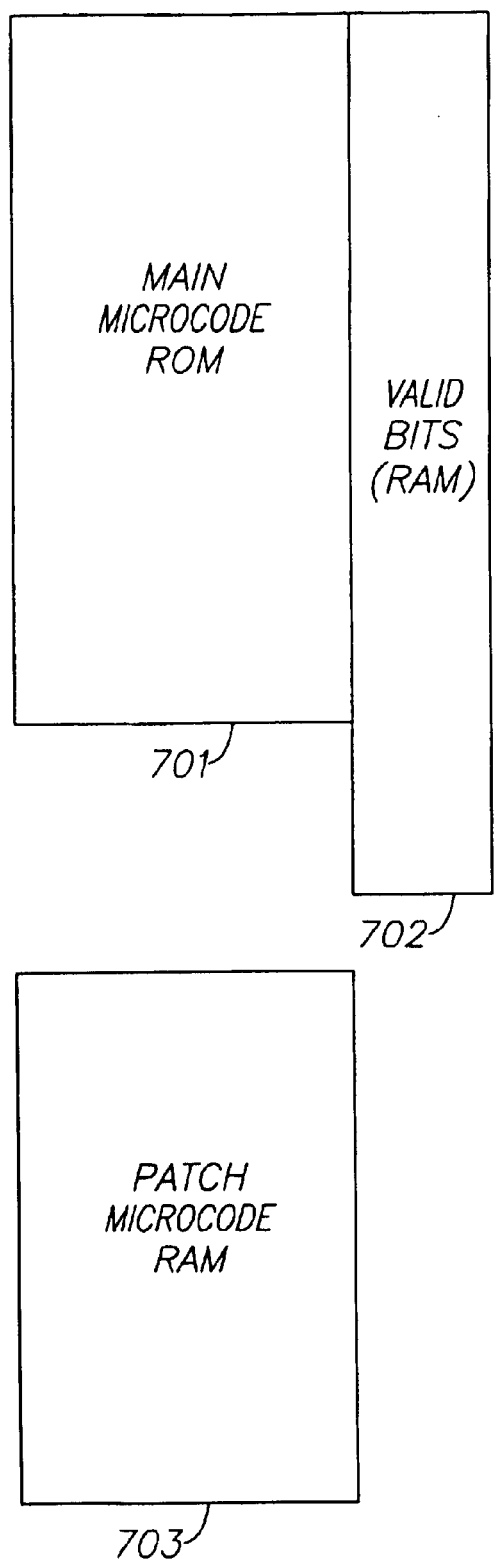
FIGS. 7A, 7B, and 7C illustrate a memory architecture in which specified RAM bits are used to control the selection of main microcode ROM or patch microcode RAM.
Figure 7B:
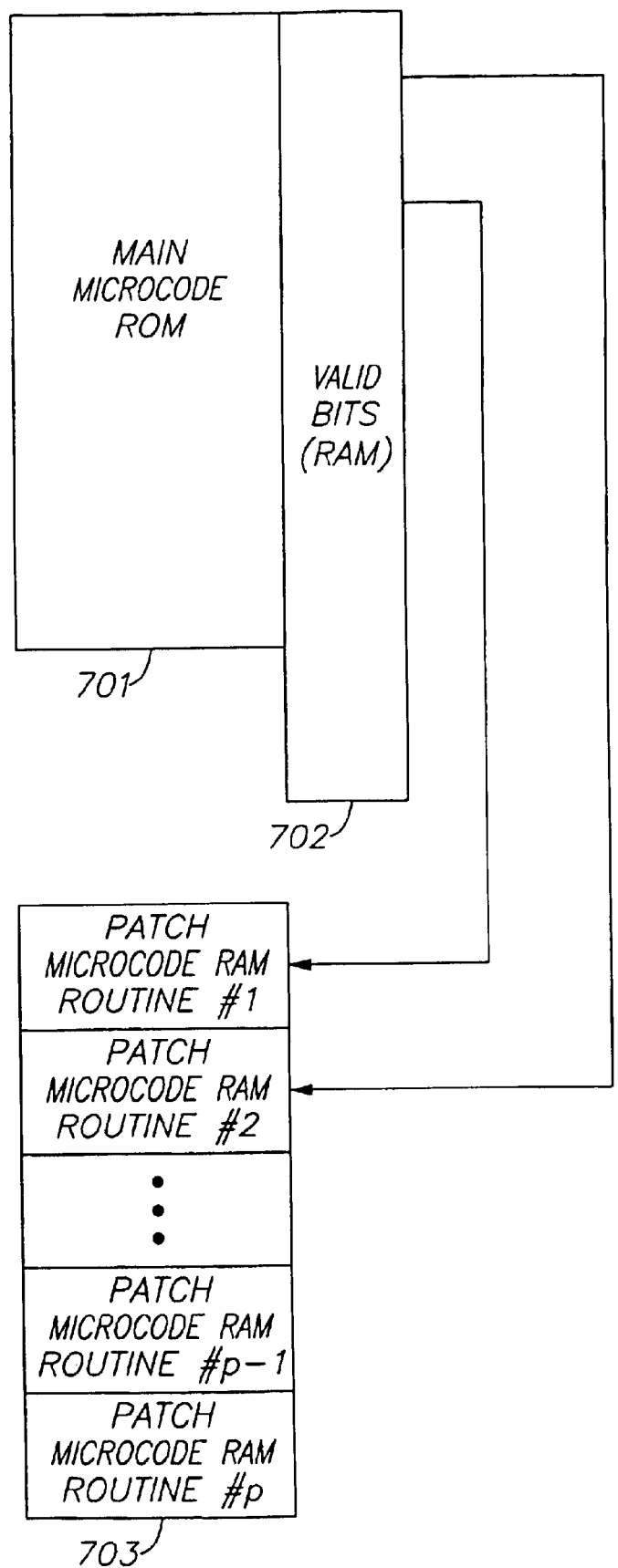
Figure 7C:
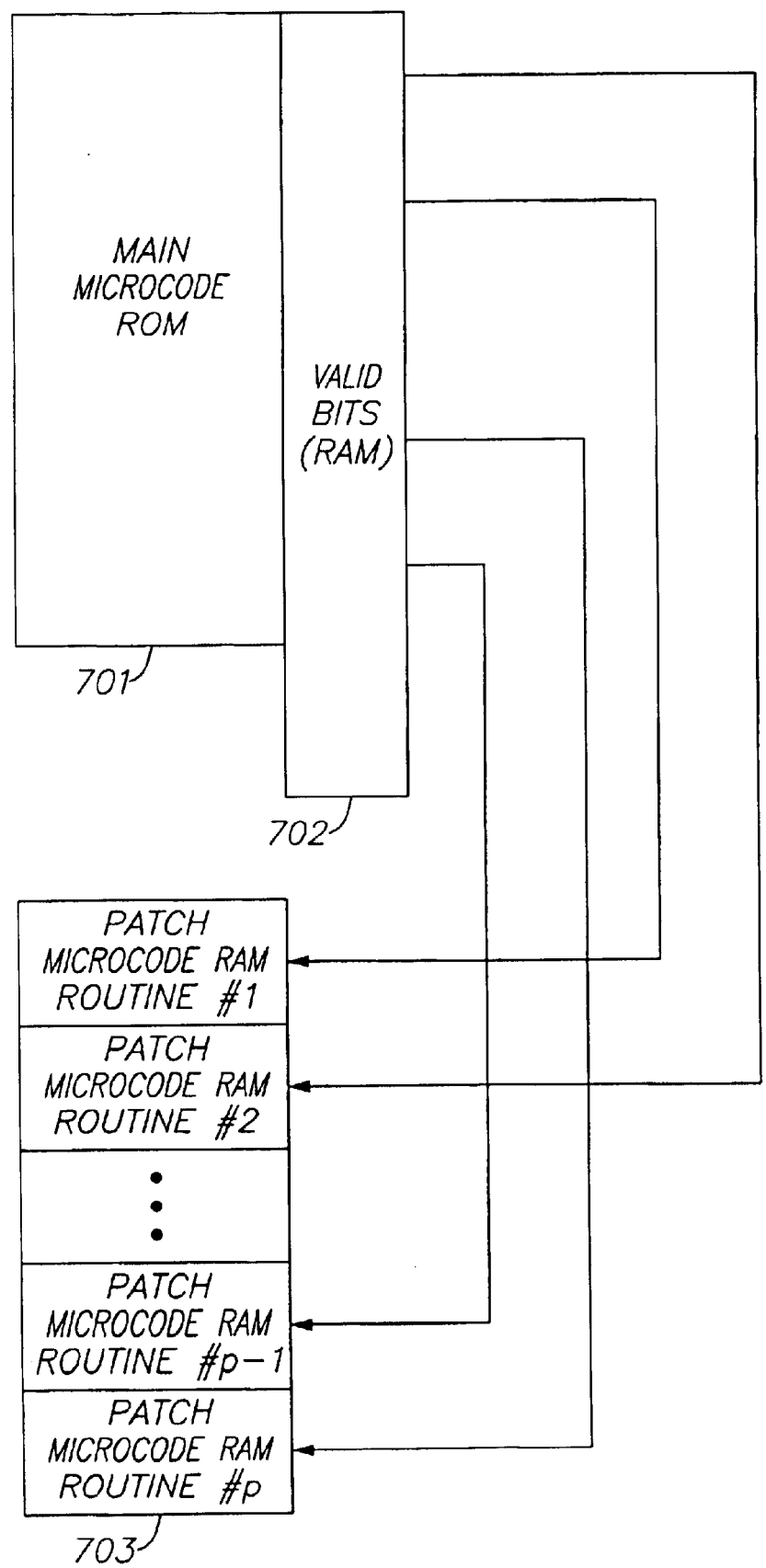

FIGS. 7A, 7B, and 7C illustrate a memory architecture in which all ROM microcode is stored in the same address space. Any program reference to a specific ROM microcode address 701 will also reference the same address in a portion of RAM designated to hold one or more "valid" bits 702. The number of allocated valid bits, n, depends upon the allowed or anticipated range of starting addresses, $2^n$, of any microcode patches provided for. Each patch may consist of a single microcode instruction, or a sub-routine consisting of a number of instructions commenced from a given starting address and executed sequentially through a series of addresses. The valid bits will be set to denote the starting address of the patch instruction or routine. As shown in FIG. 7A, and illustrated in FIG. 8 discussed below, if there are no changes to the ROM microcode, the valid bit(s) will be set to the "off" or "valid" condition, and all ROM instructions will be executed in routine fashion. If there have been changes to any of the ROM instructions, such changes are loaded into an allocated "patch" RAM area of memory 703. In this case, when the patch is received by the system, the valid bits are set so as to denote the starting address in RAM of the patch or patch routine. The patch RAM microcode routine address designated by the valid bit(s) is executed rather than the corresponding ROM routine. FIG. 7C shows how entirely new microcode can be loaded in the patch RAM area and designated for execution by the corresponding valid bits.

Figure 8:
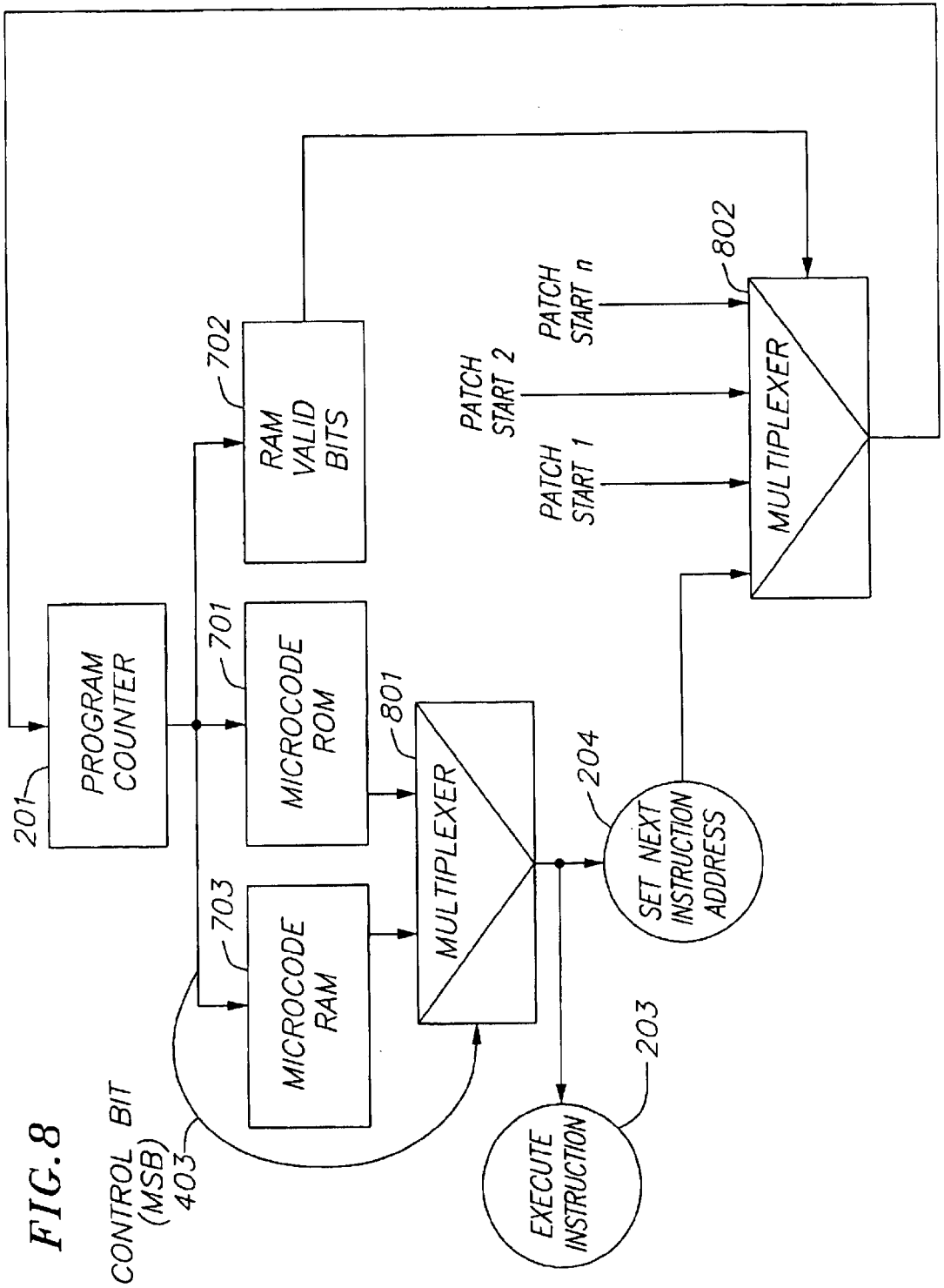
FIG. 8 is a block diagram showing the functional implementation of the memory architecture illustrated in FIGS. 7A, 7B, and 7C.

FIG. 8 illustrates a system for implementing the memory architecture shown in FIGS. 7A, 7B, and 7C. The program counter 201 simultaneously addresses ROM 701, RAM 703, and the RAM valid bit(s) 702. The ROM 701 and RAM 703 are inputs to multiplexer 801. An MSB or other control bit 403 from the program counter is input to the select terminal of the multiplexer. Depending upon the state of the MSB, the RAM or ROM microcode instruction is selected as the output signal of the multiplexer. The instruction is conventionally executed 203, and the address of the next instruction for execution is conventionally determined 204 and used as an input to a second multiplexer 802 rather than being sent to the program counter 201. The start address of any loaded patch instruction or routine (from RAM 703) are also input to multiplexer 802. The RAM valid bits are input to the select terminal of the multiplexer and used to select the address of the next instruction for execution by the program counter.

Figure 9A:
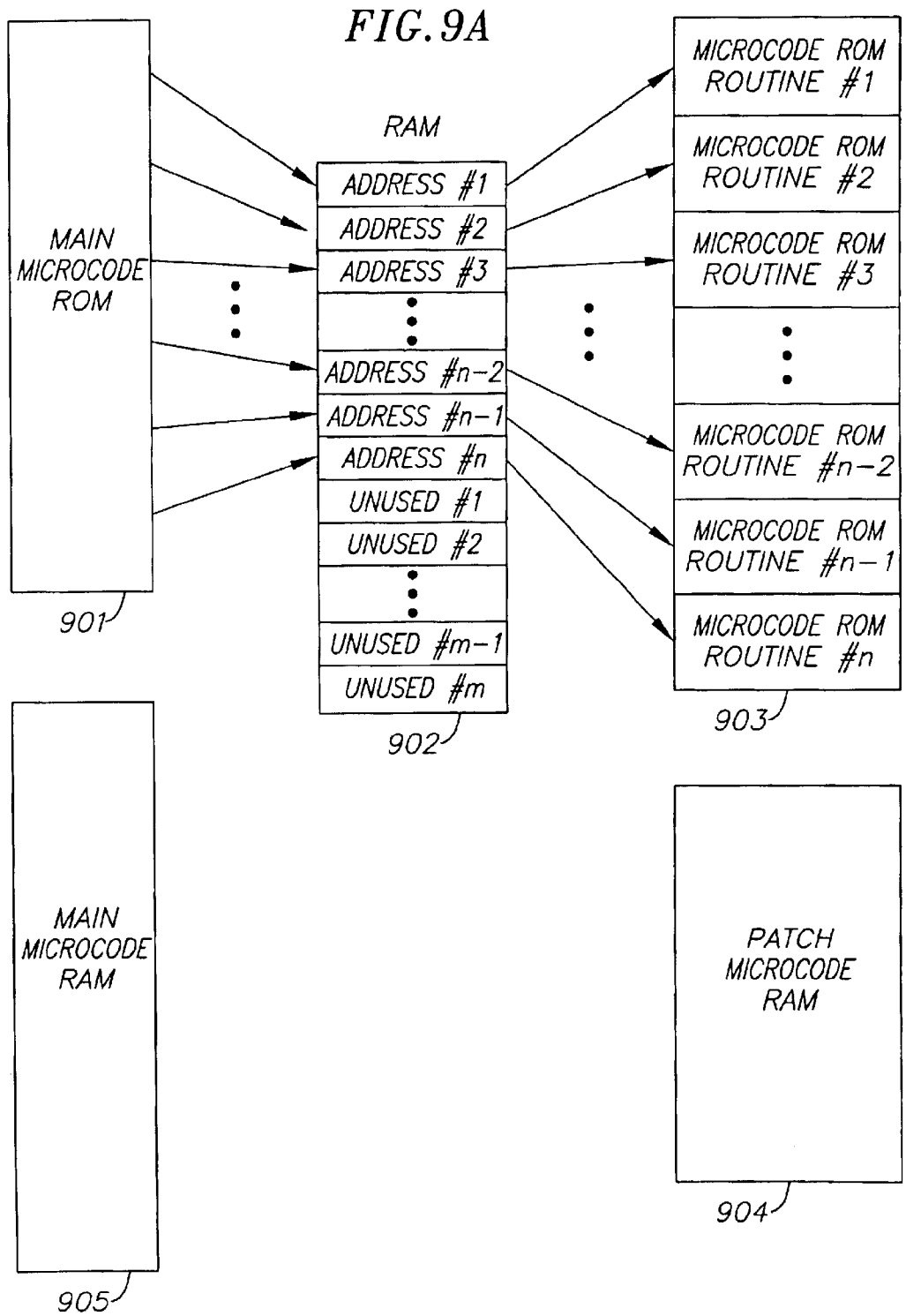
FIGS. 9A, 9B, and 9C illustrate a memory architecture in which an "index" method is used to select the execution of ROM or RAM microcode as desired.
Figure 9B:
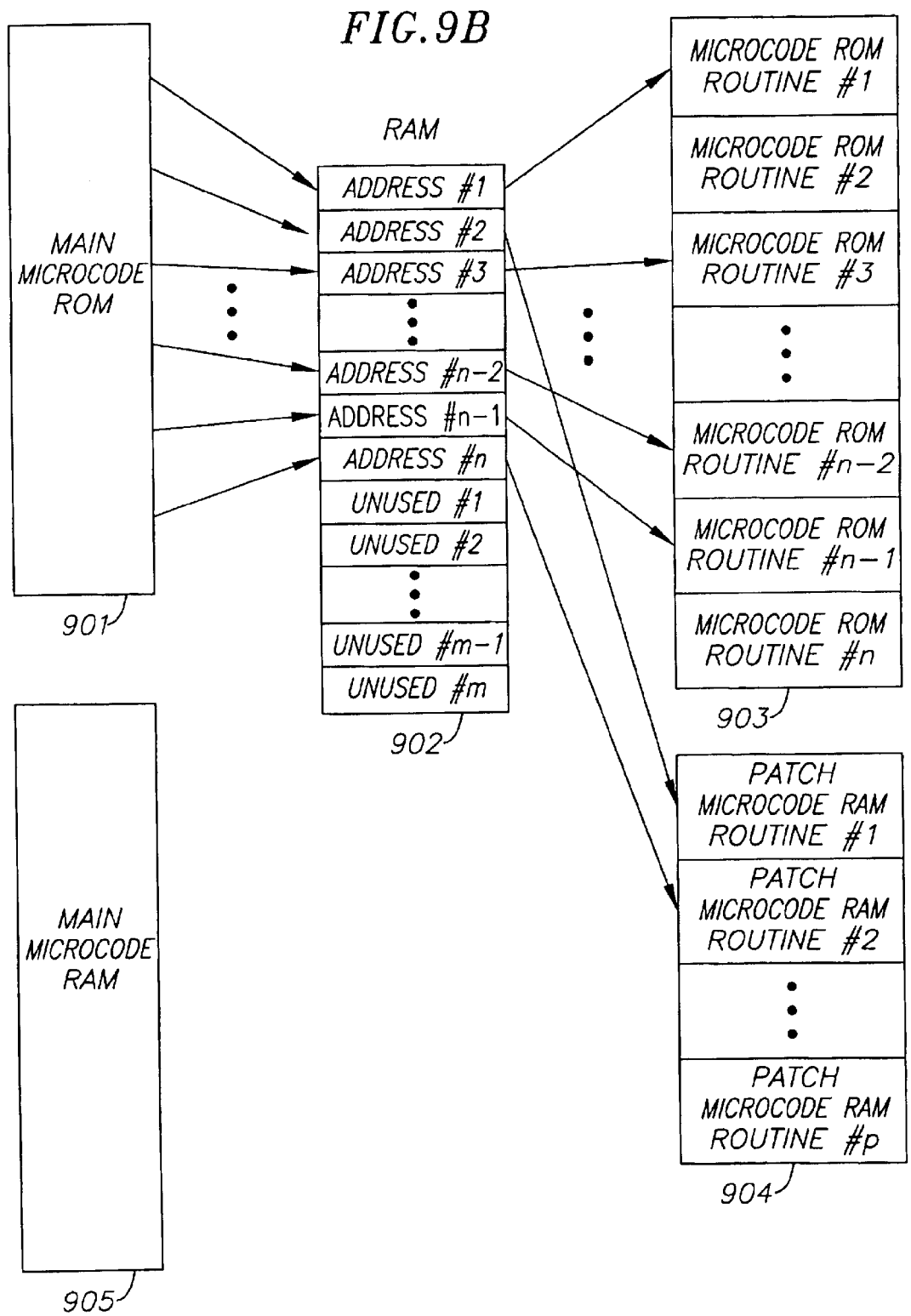
Figure 9C:
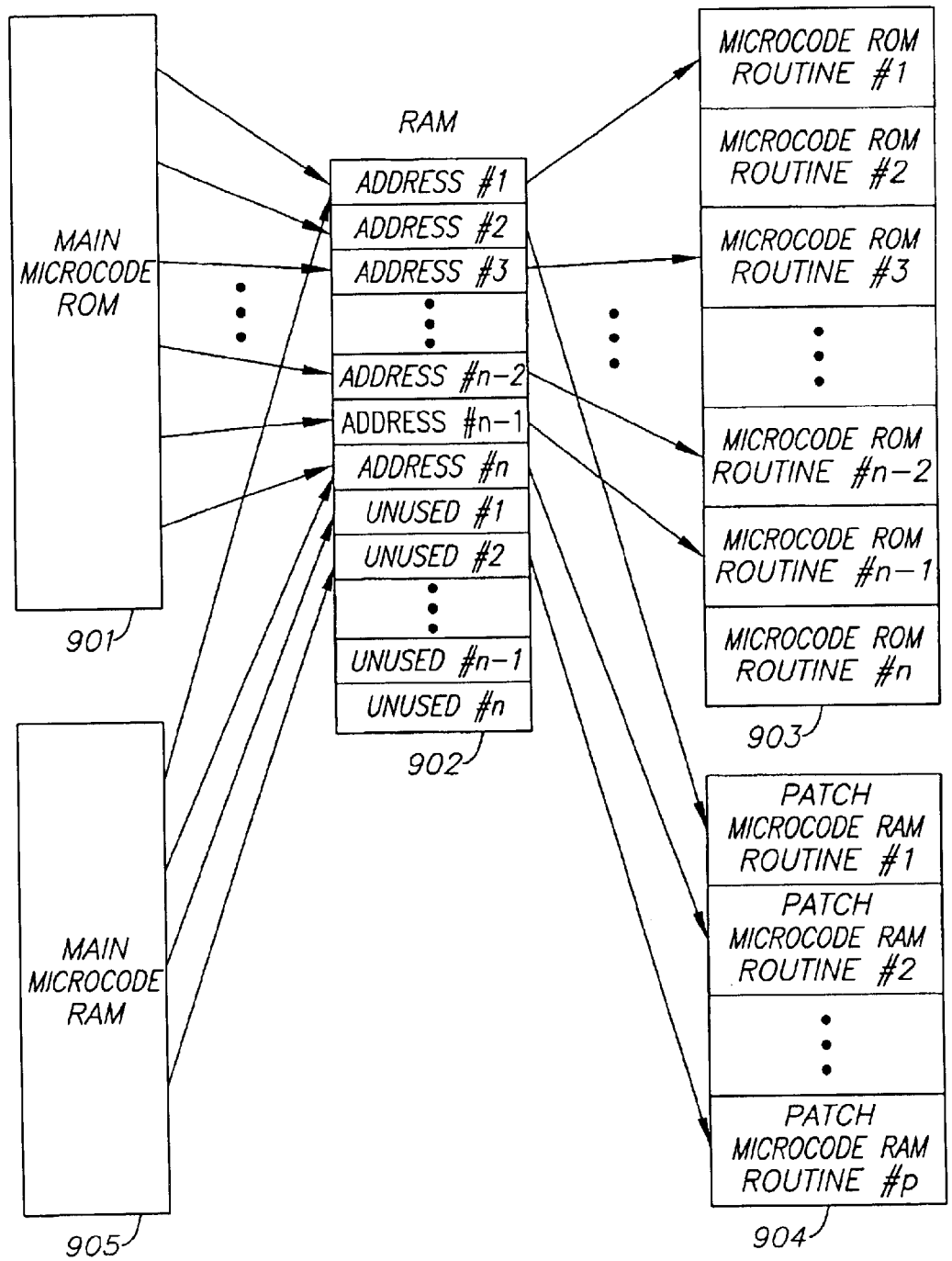

FIGS. 9A through 9C illustrate a memory architecture in which a portion of system RAM (denoted "index" RAM), 902, is used to store the address location for each ROM microcode routine 903 or instruction. The addresses are loaded into index RAM when the system is initialized on startup, or when a patch to system ROM microcode is received. When a microcode ROM 901 routine or instruction is to be executed, the system is directed to obtain the microcode address from index RAM, which can be done by well known programming techniques. As shown in FIG. 9A, if there has been no change or addition to the microcode, the system will be directed to a ROM address, whereupon it will execute the routine or instruction stored in ROM.

FIG. 9B illustrates how patch RAM routines in 904 are executed instead of ROM routines in 903. The patch RAM routines are installed in 904 and the index addresses in 902 are selectively changed, to point to the locations of the correct routines. As shown in FIG. 9B, if a patch has been received and loaded in the patch RAM addresses area 904, the applicable RAM address will be submitted for the corresponding ROM instruction address and the routine executed in order from the patch RAM 904.

FIG. 9C illustrates the case when entirely new microcode has been received. The new instructions are loaded into main RAM 905 and the locations of the updated routines in patch RAM 904 are written to the index RAM 902. FIG. 9C illustrates two key points. First, FIG. 9C shows how the main microcode Ram 905 calls both ROM routines in 903 and patch RAM routines in 904 by selectively changing the index addresses in 902. Second, FIG. 9C shows how new updated RAM routines in 904 are executed by the main microcode RAM 905 by adding new entries to the previously unused space of the index address RAM 902 to point to the locations of the new routines. The Patch Microcode RAM Routine #p in 904 is an example of an updated RAM routine.

Figure 10:
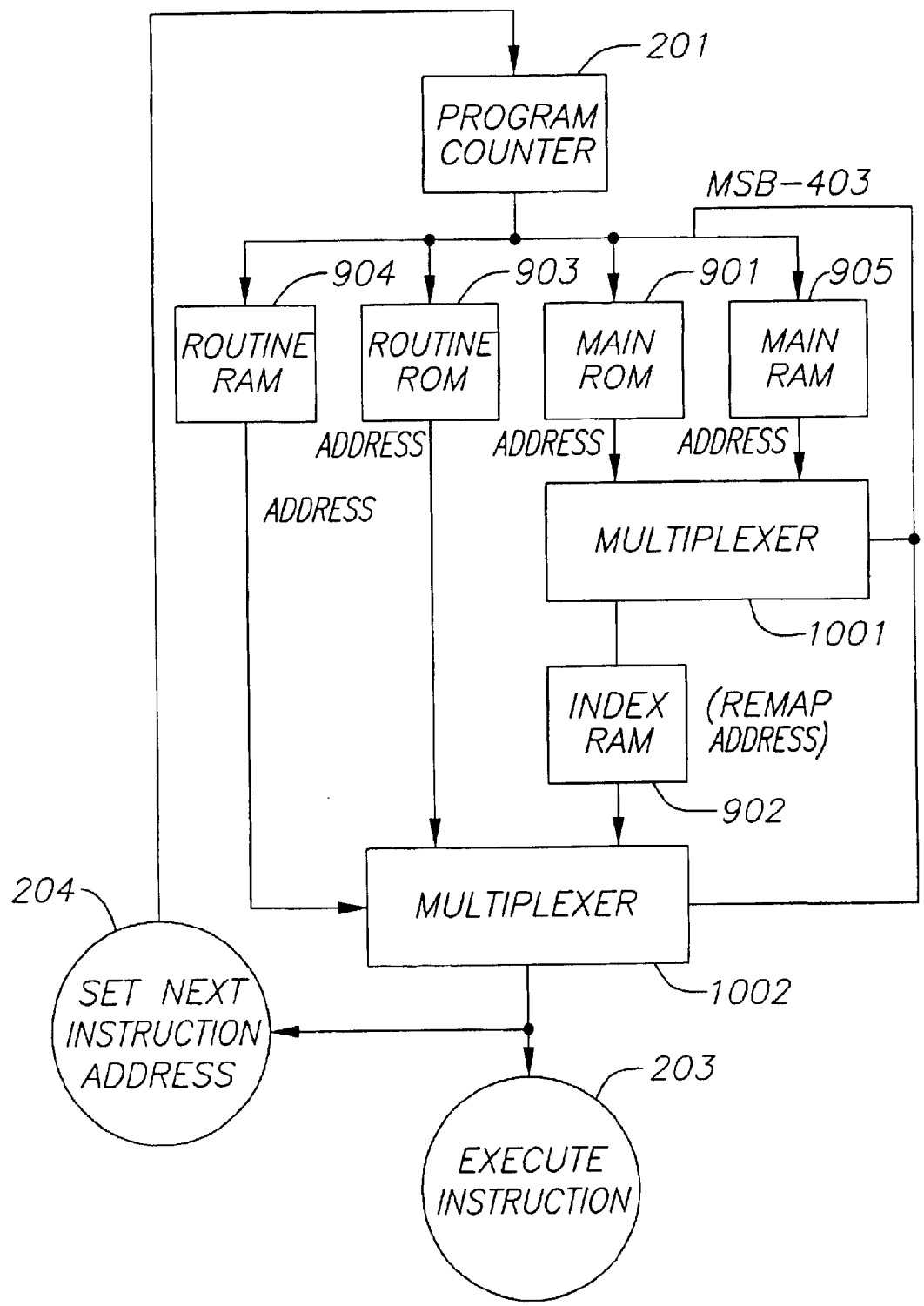
FIG. 10 is a block diagram showing the functional implementation of the memory architecture illustrated in FIGS. 9A, 9B, and 9C.

FIG. 10 illustrates a system for implementing the memory architecture shown in FIGS. 9A, 9B, and 9C. Program counter 201 simultaneously addresses routine ROM 903, main ROM 901, main RAM 905, and routine RAM 904. The address portion of the main RAM and main ROM microcode are used as inputs to multiplexer 1001. The most significant bit (MSB) 403 or other control bit from the program counter 201 is used to select the output of multiplexer 1001. Depending upon the status of the MSB or other control bit, the main ROM microcode address or main RAM microcode address is selected for output from multiplexer 1001. The selected RAM or ROM address portion of the instruction is then conventionally mapped to its corresponding address in the index RAM 902. The RAM or ROM address determined by the index RAM 902 is then used as an input to multiplexer 1002. The address portions of routine ROM microcode and routine RAM microcode are input to multiplexer 1002. Again, the most significant bit (MSB) or other control bit 403 from the program counter 201 is used to select the output of multiplexer 1002. Depending upon the status of the MSB or other control bit, routine ROM microcode, routine RAM microcode, main ROM or main RAM is selected for output and execution 203 and to set the address for the next instruction 204.

Figure 11:
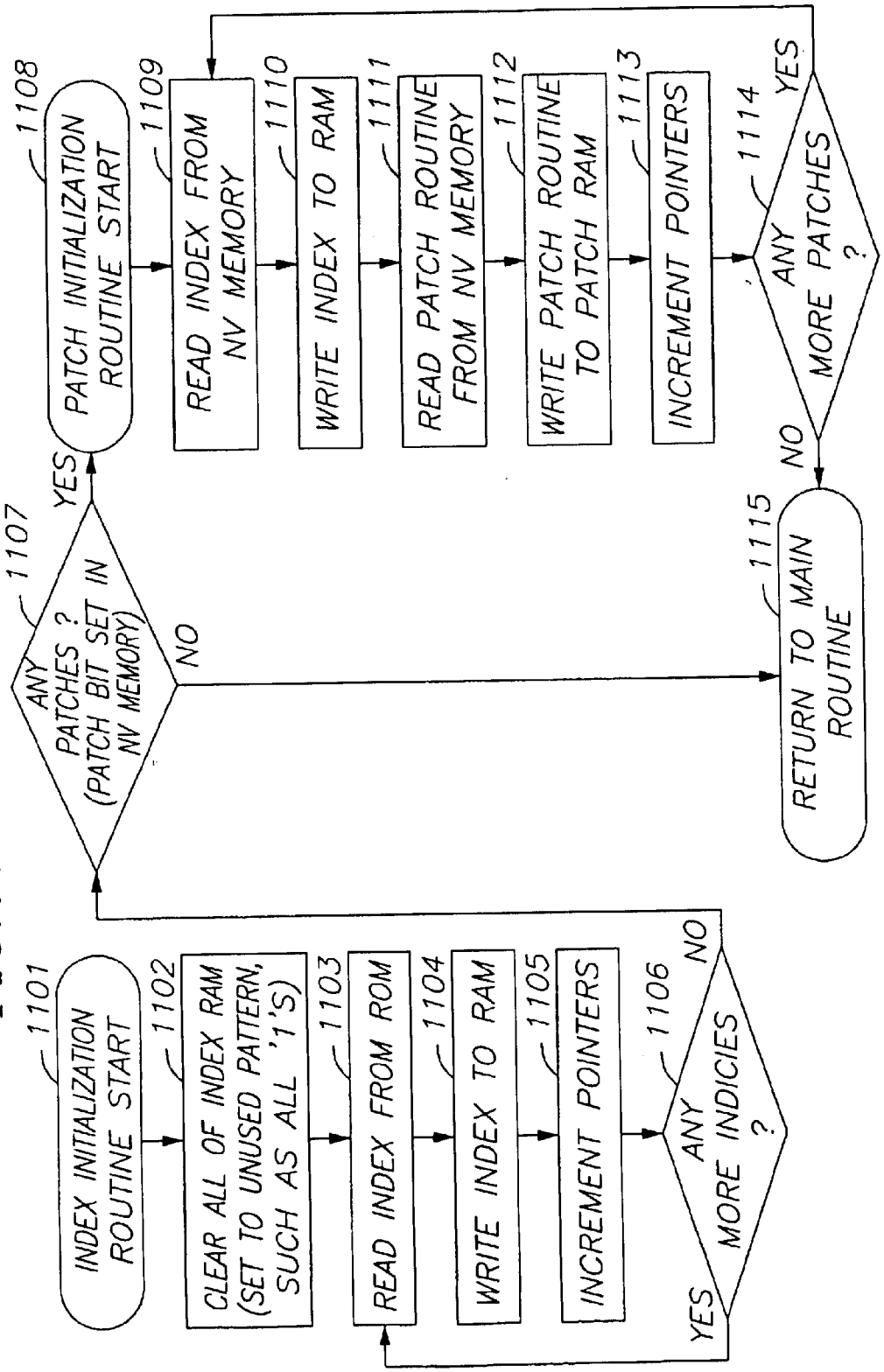
FIG. 11 is a programming flow chart showing a microcode patch initialization routine for the memory architecture shown in FIGS. 9A, 9B, and 9C.

FIG. 11 is a programming flow chart showing a microcode patch initialization routine for the memory architecture depicted in FIGS. 9A, 9B, and 9C. After program initialization 1101, all index RAM locations are set to the unused pattern (such as all "1s") 1102. An index is read from ROM 1103 and written to RAM 1104, and pointer incremented to show the next index location 1105. The process is repeated until all indexes are initialized in order 1106. Once the indexes are initialized, the presence of a microcode patch is queried from non-volatile memory used to store any patch routines by, for example, sampling the status of a designated "patch" bit 1107. If a patch is detected, the patch initialization routine is started 1108, its index is read from non-volatile memory 1109 and written to the corresponding RAM index location 1110. The patch routine is then read from non-volatile memory 1111 and written to the designated patch RAM area of memory 1112. The program pointer is incremented 1113 and the process repeated until all patches have been indexed and written to RAM 1114. The patch initialization program then returns to the main routine 1115. Those skilled in the art will understand that this is only one of many possible programs for loading patched microcode into RAM and indexing its location(s).

This disclosure is illustrative and not limiting. Further modifications will be apparent to one skilled in the art and are intended to fall within the scope of the appended claims.

We claim:

1. A microprocessor system comprising:

a read-only memory (ROM) storing microcode, the ROM having a plurality of ROM memory addresses;

a random access memory (RAM) storing microcode, the RAM having a plurality of RAM memory addresses corresponding to at least the same ROM memory addresses and one or more data bits for the selection of corresponding ROM or RAM microcode for execution;

a multiplexer coupled to receive as input signals the ROM microcode and RAM microcode, and having its control port coupled to receive said one or more RAM data bits, and providing an output signal selected from the RAM or ROM input signals as determined by said one or more RAM data bits.

2. The system of claim 1 wherein:

said ROM stores a first microcode and said ROM comprises a plurality of storage units, each storage unit having a predetermined width;

said RAM comprises a plurality of storage units, each RAM storage unit having a width greater than said predetermined width, each RAM storage unit having a first portion of said predetermined width and a second portion, at least one storing therein a second microcode;

said multiplexer having a first input port coupled to said ROM, a second input port coupled to said first portions of said RAM, said control port coupled to said second portion of said RAM, and output port providing said output signal; and a logic circuit coupled to the output port of the multiplexer, thereby executing in the alternative one of the first microcode and the second microcode.

3. The system of claim 1, wherein the address for each microcode instruction to be executed is stored in said RAM, said address selectably located in ROM or RAM and containing microcode for execution.

4. The system of claim 1, wherein each microcode instruction stored in said ROM corresponds to an address location of said RAM and said one or more of said data bits.

5. The system of claim 1, wherein said microcode instruction stored in ROM corresponds to an address location of said RAM and to said one or more of said bits.

6. The system of claim 1, wherein said ROM stores a plurality of microcode instructions each in an associated location; and said data bits stored in RAM are each stored in a location corresponding to one of the locations associated with said ROM microcode instructions.

7. A method for selectably executing microcode in a microprocessor system, comprising:

storing microcode in a read-only memory (ROM), the ROM having a plurality of ROM memory addresses;

storing microcode and one or more data bits in a random access memory (RAM), the RAM having a plurality of RAM memory addresses corresponding to at least the same ROM memory addresses;

coupling said ROM and RAM microcode as input signals to a multiplexer having its control port coupled to said one or more RAM data bits, and providing an output signal selected from the RAM or ROM input signals as determined by said one or more RAM data bits.

* * * * *